Dec. 24, 1963   J. D. BROWN   3,115,173
FEED PAN ARRANGEMENT FOR MEAT CHOPPERS
Filed May 16, 1961   3 Sheets-Sheet 1
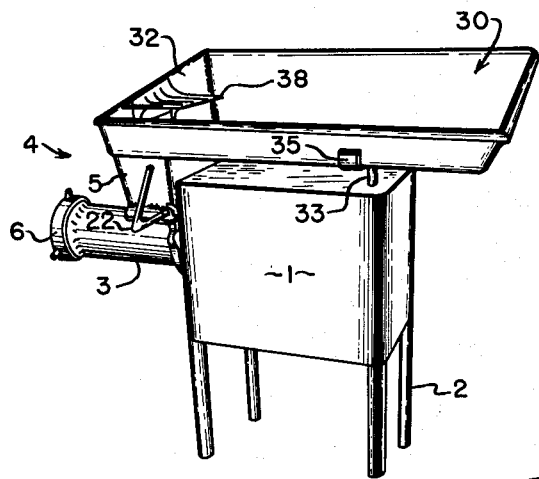
*Fig. I*
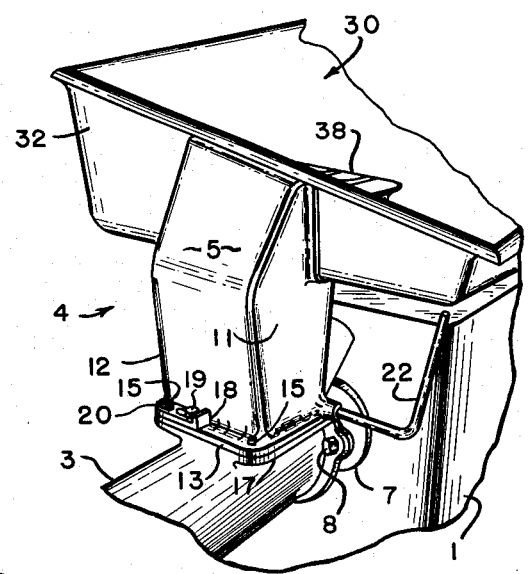
*Fig. II*
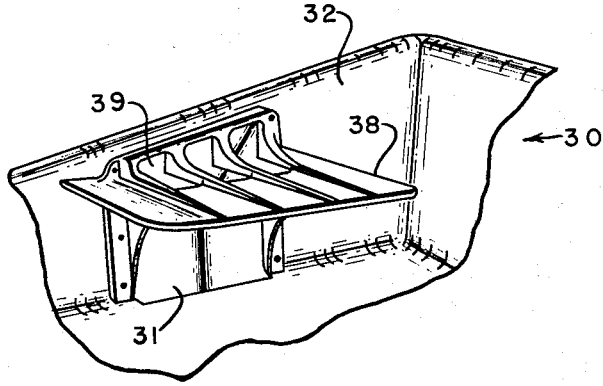
*Fig. III*
INVENTOR.
JAMES D. BROWN
BY
Marshall & Wilson
ATTORNEYS Dec. 24, 1963   J. D. BROWN   3,115,173
FEED PAN ARRANGEMENT FOR MEAT CHOPPERS
Filed May 16, 1961   3 Sheets-Sheet 2
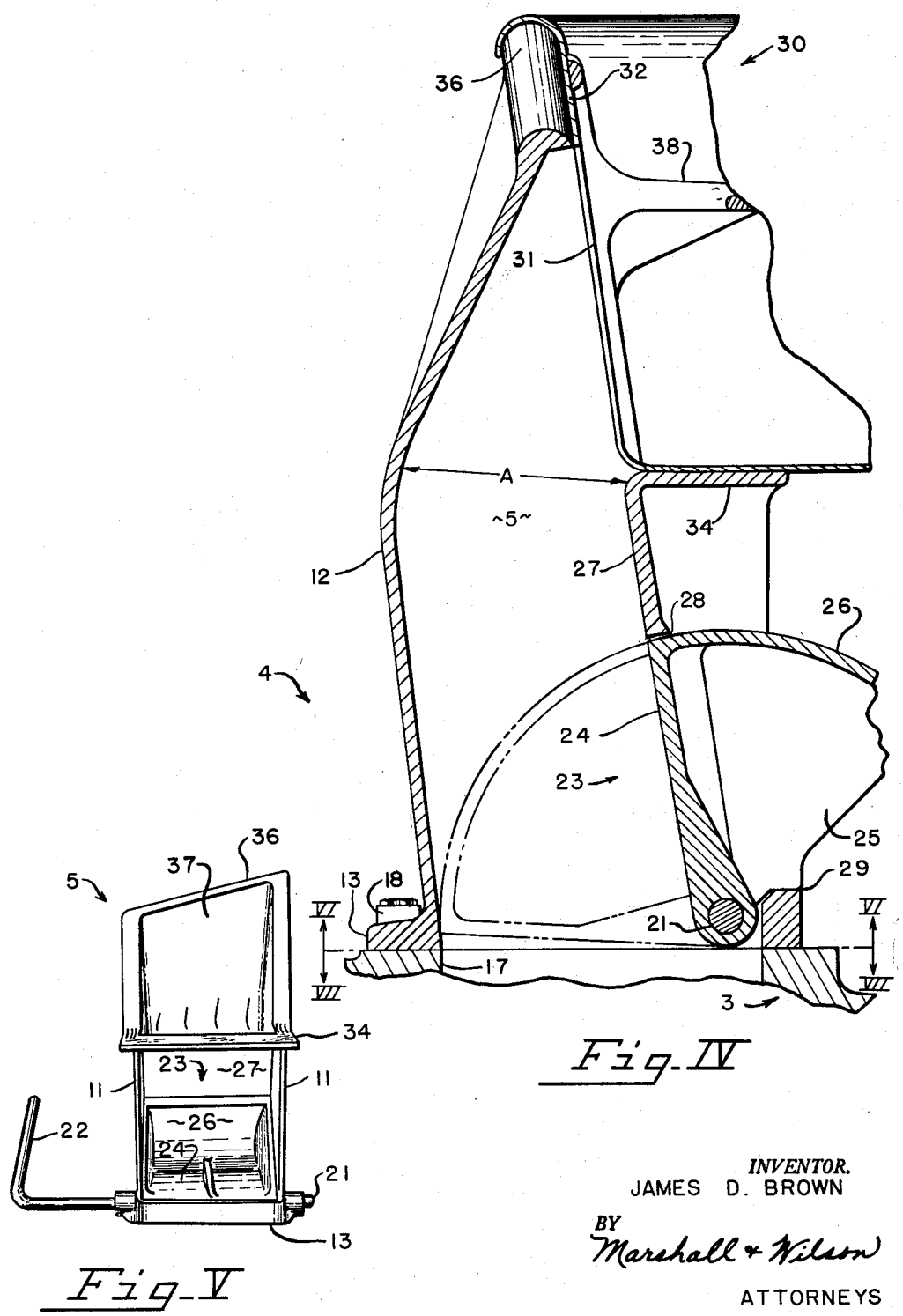
Fig. IV
Fig. V
INVENTOR.
JAMES D. BROWN
BY
Marshall & Wilson
ATTORNEYS

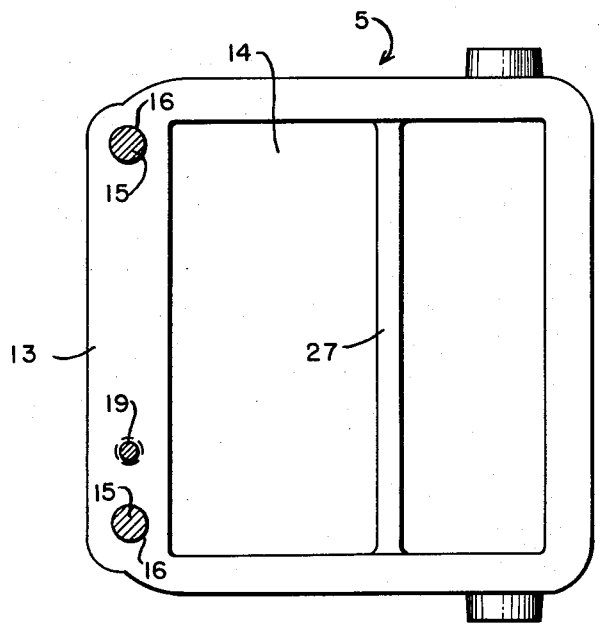
Fig. VI
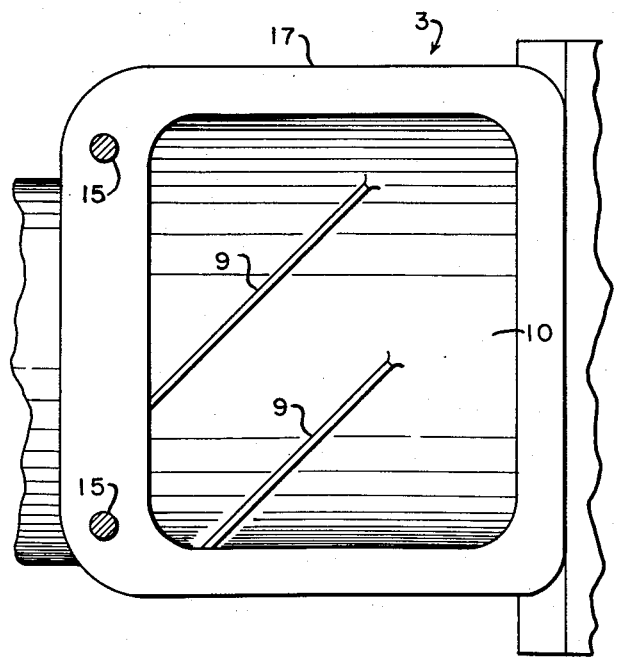
Fig. VII
INVENTOR.
JAMES D. BROWN
BY Marshall & Wilson
ATTORNEYS United States Patent Office 3,115,173
Patented Dec. 24, 1963

3,115,173
FEED PAN ARRANGEMENT FOR
MEAT CHOPPERS
James D. Brown, Toledo, Ohio, assignor to Toledo Scale
Corporation, Toledo, Ohio, a corporation of Ohio
Filed May 16, 1961, Ser. No. 110,485
4 Claims. (Cl. 146—182)

This invention relates to machines for comminuting food and particularly to an improved bowl and feed pan for such machines.

Machines for comminuting food are usually equipped with a single feeding worm which extends through a cylindrical feeding barrel having fluted walls. The food is inserted into one end of the feeding barrel and rotation of the feeding worm on its longitudinal axis feeds the food through the feeding barrel and against a perforated plate which closes the other end of the feeding barrel. The pressure exerted on the food by the feeding worm forces it against the face of the perforated plate and causes small protuberances of food to extend into and through the perforations. A rotary knife, mounted on the end of the feeding worm, revolves cutting off small nodules of food.

The feeding barrel usually is integrally formed with a feeding chamber, the barrel and chamber forming a one-piece bowl which is relatively difficult to handle and clean. This feeding chamber in prior machines usually is in the general form of a funnel causing bridging of the food in the small part of the funnel over the worm and is of a size and arrangement such that one easily can reach through the feeding chamber and get his fingers caught in the feeding worm.

The feeding chamber, in large capacity machines, is supplied with food from a feed pan. The feed pan in prior machines has an opening in its bottom communicating with the ingress opening of the feeding chamber. This bottom opening reduces the capacity of the pan because food to be fed into the machine is piled around the opening.

The objects of this invention are to improve food comminuting machines, to increase the capacity of such machines, to increase the speed of operation of such machines, to facilitate the handling and the cleaning of such machines, to increase the safety of operation of such machines, to simplify the construction of such machines, and to simplify the operation of such machines.

One embodiment of this invention enabling the realization of these objects is a machine for comminuting food having an improved bowl and feed pan.

One feature of this invention resides in constructing the bowl from two pieces which, thus, is easy to handle and clean and in making the two pieces readily detachable to facilitate the cleaning operation.

Another feature resides in arranging the upper piece of the bowl as a chute which is formed to obviate bridging of the food over the feeding worm.

A further feature resides in the sizes and arrangement of the bowl and a feed pan guard which are such that one cannot reach through the opening in the feed pan and touch the worm.

Still another feature resides in providing the feed pan with an egress opening through an end wall of the feed pan, instead of with the usual opening in the bottom of the feed pan, to increase the capacity of the feed pan without increasing its size.

The above and other objects and features of this invention will be appreciated more fully from the following detailed description when read with reference to the accompanying drawings wherein:

FIG. I is a perspective view of a machine for comminuting food which is equipped with the two-piece bowl and end feed pan according to this invention;

FIG. II is an enlarged, fragmentary view of the two-piece bowl and end feed pan illustrated in FIG. I;

FIG. III is an enlarged, fragmentary view of the end feed pan illustrated in FIG. I;

FIG. IV is an enlarged, fragmentary, vertical sectional view of the two-piece bowl and end feed pan illustrated in FIG. I;

FIG. V is an enlarged, perspective view of the upper piece of the two-piece bowl illustrated in FIG. I removed from the machine and showing its ingress opening for food to be comminuted;

FIG. VI is a plan view of the upper piece of the two-piece bowl as seen from a position along the line VI—VI of FIG. IV, the food stomper shown in FIG. IV being removed for clarity of illustration; and FIG. VII is a fragmentary, plan view of the lower piece of the two-piece bowl as seen from a position along the line VII—VII of FIG. IV, the feeding worm being removed from the bowl for clarity of illustration.

Referring to the drawings, the machine for comminuting food includes a housing 1, supported on four legs 2, containing driving means for a feeding worm or feed screw which is not shown but which is like the worm shown and described in U.S. Patent No. 2,786,505 issued March 26, 1957 to James D. Brown. The feeding worm is rotatably mounted in a lower piece or feeding barrel 3 of a two-piece bowl 4 to carry a commodity initially fed into an upper piece 5 of the two-piece bowl 4 toward the discharge end 6 of the lower bowl piece 3 where the commodity is comminuted. The lower bowl piece 3 is cylindrically shaped and is attached to the end of a gear case 7, mounted within the housing 1, by means of several bolts and nuts, one of the bolts 8 being shown in FIG. II. Spiral flutes 9 (FIG. VII) are formed integrally with the inner surface of the lower bowl piece 3 to assist the feeding worm. As shown in FIG. VII, the lower bowl piece 3 is provided with an ingress opening 10 for the reception of the commodity to be comminuted.

The upper bowl piece 5 functions as a chute for carrying the commodity to be comminuted to the lower bowl piece 3 and comprises two generally flat and parallel side walls 11 and a front wall 12 which extend upwardly from a foot 13 defining an egress opening 14 (FIG. VI) of a size and shape corresponding to the size and shape of the ingress opening 10 in the lower bowl piece 3. The egress opening 14 of the upper bowl piece or chute 5 is of rectangular shape and the walls 11 and 12 extend generally vertically upwardly therefrom. An open mouth 37 (FIG. V) at the top of the upper bowl piece or chute 5 receives pieces of commodity which start falling in a throat indicated by the line A in FIG. IV and defined as the upper portion of the chute 5 wherein the commodity starts falling after being pushed into the mouth 37. The cross-sectional area of the chute 5 increases from the throat to the bottom of the chute permitting an unimpeded drop of the commodity down the chute onto the worm obviating bridging of the commodity in the chute over the feeding worm. This arrangement also is desirable should the chute 5 be formed integrally with the lower bowl piece 3 and is in contrast to prior bowls which usually are shaped in the general form of funnels in which the commodity often gets stuck in the small parts of the funnels during the feeding operations.

The lower bowl piece 3 carries two pins 15 which are received in openings 16 (FIG. VI) in the upper bowl piece 5 to detachably mount the upper bowl piece 5 on the lower bowl piece 3. When the pieces of the two-piece bowl 4 are together with the pins 15 received in the openings 16, the foot 13 of the upper bowl piece 5 rests upon a corresponding horizontal ledge 17 (FIG. VII) of the lower bowl piece 3 and the ingress opening 10 of the lower bowl piece 3 and the egress opening 14 of the upper bowl piece 5 form a throat at this intersection of the bowl pieces. The bowl 4 because it is constructed from two pieces is easy to handle and clean. Little effort is needed to lift the upper bowl piece 5 from the pins 15 to dismantle the bowl. The upper bowl piece 5 is kept in place on the pins by means of a slide latch 18 slidably mounted on a shoulder screw 19 carried by such bowl piece 5 and having an oversize opening 20 which receives one of the pins 15, such pin 15 having a groove in which the latch 18 is caught in its position shown in FIG. II for the purpose of latching the bowl pieces together.

A shaft 21, extending generally parallel to the front wall 12 of the upper bowl piece 5, is pivotally mounted in the foot 13 and has an extension 22 which functions as a handle. A stomper 23, which is a hollow member having a flat front wall 24, two flat side walls 25 and a curved upper wall 26, is secured to the rotatable shaft 21. In the position of the stomper 23 shown in solid lines in FIG. IV, the front stomper wall 24 forms part of the rear wall of the upper bowl piece 5, a web 27 formed in the upper bowl piece forming the rest of such rear wall. Should the commodity to be comminuted get stuck in the upper bowl piece 5 or at least does not feed properly, the stomper 23 is pivoted by means of manually applied force on the handle 22 into its positions shown in broken lines in FIG. IV. In assuming such position shown in broken lines, the front stomper wall 24 forces the commodity down into the feeding worm in the lower bowl piece 3. In such position shown in broken lines, the curved stomper wall 26 cuts off the feed of commodity down the chute preventing the commodity from falling out of the opening 28 in the chute which normally is closed by the front stomper wall 24 as shown in solid lines in FIG. IV. In the commodity stomping position of the stomper 23 (broken lines) the bottom of the front wall 12 of the upper bowl piece 5 acts as a stop for the stomper and in the inoperative position of the stomper 23 (solid lines) the top of the foot 13 at 29 acts as a stop for the stomper.

Another one of the features of the machine resides in an end feed pan 30 which has an egress opening 31 through an end wall 32 instead of through the bottom of the feed pan as is usual in prior feed pans. The egress opening 31 being through the end wall 32 instead of through the pan bottom increases the capacity of the feed pan without increasing its size. The commodity to be comminuted in the prior machines is piled in the feed pans around the bottom opening, such opening subtracting from the total area of the pan bottom. In the present machine, the commodity to be comminuted is piled in the feed pan 30 utilizing the entire pan bottom for storage and then the commodity is pushed out of the egress opening 31 into the upper bowl piece 5. Hence, the pan 30 is a relatively high-capacity end feed pan in contrast to the relatively low-capacity bottom feed pans of the prior art.

The bottom of the end feed pan 30 is supported by a pair of posts 33 atop the housing 1, one of which is shown in FIG. I, and shelf 34 extending horizontally from the upper bowl piece 5, the posts 33 carrying a strap 35 having openings (not shown) which receive pins (not shown) welded to the bottom of the pan 30 to help maintain the pan stationary. The end wall 32 of the pan 30 is bent down and is hooked over an upper edge 36 of the upper bowl piece 5 to also help maintain the pan stationary. The pan 30 is removed from the machine to permit dismantling of the two-piece bowl 4. When the pan 30 is in place, the egress opening 31 in the pan 30 is so juxtaposed to the open mouth 37 at the top of the upper bowl piece 5 that when pieces of commodity are pushed through the egress opening 31 in the pan 30 they are received by the upper bowl piece 5 and guided to the lower bowl piece 3 therebelow. The mouth 37 is defined by the upper edges of the chute walls 11 and 12 and the web 27.

A guard 38 is carried by the end pan wall 32 to prevent one from reaching down the chute far enough to touch the feeding worm in the lower bowl piece 3. The guard 38 is provided with openings 39 which are small enough to prevent the entrance of a hand and arm but large enough to allow strips of commodity, such as frozen meat, to be inserted for feeding down the chute. The physical sizes of the upper bowl piece 5 and the guard are such, as a safety precaution, that one cannot reach down the chute and touch the feeding worm.

It is to be understood that the above description is illustrative of this invention and that various modifications thereof can be utilized without departing from its spirit and scope.

Having described the invention, I claim:

1. In a machine for comminuting food, in combination, a bowl within which the food is comminuted, having an upper ingress opening, an end feed pan which is substantially wider than its average depth and which comprises an end wall having therein an egress opening into which the operator may direct pieces of food, a shelf-like guard extending rearward above the egress opening of the pan, the pan being otherwise substantially free of obstructions throughout its area to permit sweeping movements of the hands and arms of the operator in moving the pieces of food forward into the egress opening, and a chute which extends forward from the egress opening of the pan and downward to the ingress opening of the bowl and which has the upper portion of its front wall inclined forward and downwardly to deflect the pieces of food into the ingress opening of the bowl.

2. A machine for comminuting food as claimed in claim 1 wherein the chute is detachable from the bowl.

3. A machine for comminuting food as claimed in claim 1 wherein the chute has a plurality of generally flat sides.

4. A machine for comminuting food as claimed in claim 1 wherein the cross-sectional area of the chute increases toward the bottom thereof.

References Cited in the file of this patent

UNITED STATES PATENTS

| 1,575,840 | Jeans | Mar. 9, 1926 |
| 1,951,826 | Foster | Mar. 20, 1934 |
| 2,492,233 | Meeker | Dec. 27, 1949 |

FOREIGN PATENTS

| 26,106 | Great Britain | 1904 |
| 395,944 | Germany | May 23, 1924 |
| 465,078 | Germany | Sept. 4, 1928 |
| 803,339 | Germany | Apr. 2, 1951 |
| 1,219,297 | France | Dec. 28, 1959 |
| 1,078,892 | Germany | Mar. 31, 1960 |